(12) United States Patent
Spector

(10) Patent No.: US 9,367,285 B2
(45) Date of Patent: Jun. 14, 2016

(54) THEMED ORNAMENTS WITH INTERNET RADIO RECEIVER

(71) Applicant: Donald Spector, New York, NY (US)

(72) Inventor: Donald Spector, New York, NY (US)

( * ) Notice: Subject to any disclaimer, the term of this patent is extended or adjusted under 35 U.S.C. 154(b) by 0 days.

(21) Appl. No.: 14/710,707

(22) Filed: May 13, 2015

(65) Prior Publication Data

US 2015/0245140 A1 Aug. 27, 2015

Related U.S. Application Data

(63) Continuation-in-part of application No. 13/856,795, filed on Apr. 4, 2013, now Pat. No. 9,060,040, which is a continuation-in-part of application No. 13/331,469, filed on Dec. 20, 2011, now Pat. No. 8,467,722, which is a continuation-in-part of application No. 12/180,901, filed on Jul. 28, 2008, now Pat. No. 8,099,039.

(60) Provisional application No. 60/954,879, filed on Aug. 9, 2007.

(51) Int. Cl.
| H04H 40/00 | (2009.01) |
| G06F 3/16 | (2006.01) |
| H04R 27/00 | (2006.01) |
| H04L 29/06 | (2006.01) |
| H04H 20/82 | (2008.01) |
| H04H 60/65 | (2008.01) |

(52) U.S. Cl.
CPC ............ G06F 3/165 (2013.01); H04L 65/4084 (2013.01); H04R 27/00 (2013.01); H04H 20/82 (2013.01); H04H 60/65 (2013.01); H04R 2227/003 (2013.01); H04R 2420/07 (2013.01)

(58) Field of Classification Search
CPC .................................. H04H 40/00; H04H 60/91
USPC ......... 455/3.06, 90.3, 344, 41.2, 550.1, 575.1; 709/216–219
See application file for complete search history.

(56) References Cited

U.S. PATENT DOCUMENTS

| 6,389,463 | B2 * | 5/2002 | Bolas | H04H 20/82 709/216 |
| 7,003,515 | B1 | 2/2006 | Glaser et al. | |
| 7,058,356 | B2 | 6/2006 | Slotznick | |
| 7,065,342 | B1 | 6/2006 | Rolf | |
| 7,817,591 | B2 | 10/2010 | Cooley | |
| 7,873,040 | B2 | 1/2011 | Karlsgodt | |
| 8,467,722 | B2 * | 6/2013 | Spector | H04R 27/00 455/3.06 |
| 8,472,866 | B1 * | 6/2013 | Spector | H04M 1/0254 455/3.06 |
| 8,725,065 | B2 * | 5/2014 | Spector | H04M 1/0254 455/3.06 |
| 2004/0046783 | A1 | 3/2004 | Montebovi | |
| 2004/0198175 | A1 | 10/2004 | Shively et al. | |
| 2006/0168097 | A1 | 7/2006 | Pittelli | |
| 2008/0194175 | A1 | 8/2008 | Last et al. | |
| 2010/0042920 | A1 | 2/2010 | Sigal | |

* cited by examiner

*Primary Examiner* — Sonny Trinh
(74) *Attorney, Agent, or Firm* — Collard & Roe, P.C.

(57) ABSTRACT

Apparatuses for playing signals received from the internet or other information highway on one or more speakers are described. The apparatus has a receiver for receiving information from preselected addresses; a processor for interpreting the signals; and several speakers for playing the processed signals. The speakers each have an ornamental design on the outside which is related to the topic of the signals received from the address. The apparatus could include a smartphone as the receiver.

7 Claims, 4 Drawing Sheets

THEMED ORNAMENTS WITH INTERNET RADIO RECEIVER

This application is a continuation-in-part under 35 U.S.C. §120 of U.S. patent application Ser. No. 13/856,795, filed on Apr. 4, 2013, which is a continuation in part of U.S. patent application Ser. No. 13/331,469 filed on Dec. 20, 2011 (now U.S. Pat. No. 8,467,722 issued Jun. 18, 2013), which is a continuation-in-part of U.S. patent application Ser. No. 12/180,901 filed Jul. 28, 2008 (now U.S. Pat. No. 8,099,039 issued Jan. 17, 2012), which claims the benefit of priority under 35 U.S.C. §119(e) to U.S. Provisional Patent Application Ser. No. 60/954,879, filed Aug. 9, 2007, the entirety of all of which is hereby incorporated by reference.

BACKGROUND OF THE INVENTION

This application relates to the field of internet receivers that are capable of receiving Internet radio signals. More specifically, this application relates to speakers and video screens that relate to a specific station that is received through these devices by Bluetooth, Wi-Fi or Wi-Max. It is also noted that one Bluetooth, Wi-Fi or Wi-Max Internet receiver may be used to supply signals to multiple speakers and screens.

Internet Radio Stations are easy to broadcast and with Wi-Fi and Wi-Max can be transmitted to virtually every part of the world. In fact, the problem is that so many stations are available on the Internet that it is hard for them to get traction. It is hard for those stations to get traffic even when they have been "selected" for AOL Radio or another "brand" name. Therefore, there is a need in the art for an Internet Radio player which can help an Internet Radio Station gain market share.

SUMMARY OF THE INVENTION

The present invention relates to Internet Radio receivers that area wirelessly connected to speakers and screens that have a pre-set theme. The theme may be of any number of topics. For example, one speaker could be set for a Christmas theme, another speaker for a garden theme, another for a spa theme, etc. These speakers can be placed around a home in appropriate areas, such as near a Christmas tree, in the garden and in the bathroom, respectively. Thus, music and programming appropriate to the theme of the room or area is played through each speaker automatically. Each speaker is configured with an amplifier and a microprocessor that causes the receiver to send signals from only a pre-set number of thematically appropriate stations or playlists that are saved in a database or streamed from the internet to the receiver.

The receiver has a processor that connects to an address on the internet or other information highway. The receiver is wirelessly connected to the speakers or video screens via either Wifi, or BLUETOOTH® technology. Any connection to the internet, however, can be used. The internet receiver can be incorporated into a mobile telephone. The receiver also incorporates a transmitter to transmit the internet signals to the various speakers, with a different internet signal being transmitted to each speaker or screen.

The receiver has a processor that connects to one of a plurality of preselected addresses on the internet or other information highway. The apparatus also has an interface for selecting the one of the plurality of preselected addresses. The preselected addresses are related to the themes of the various speakers and screens. For example, on a mobile telephone with internet capability, the mobile telephone could have a plurality of applications that relate to internet radio stations installed on it. Selecting one of the applications causes the mobile telephone to communicate with the speaker that corresponds to the theme of the radio station or internet site and cause that speaker to play the content of the selected site.

The speakers have exterior ornamentation that correlates with the theme of the content being played. For example, if the speaker is a garden theme, it could be designed to look like a rock or a plant. If the speaker is a Christmas theme, it could be designed as an ornament or other type of Christmas decoration. For a bathroom theme, the speaker could be built into a shower head or light fixture, or could be a separate item with a decorative appearance.

The appearance could also be configured via lighting or holographic displays emanating from the speaker, instead of a permanent physical configuration. For example, turning on the power to the speaker could cause colored lights to emanate from the speaker in a way the matches the theme of the speaker. As an example, a patriotic themed speaker would display red, white and blue light. Alternatively, each speaker could be equipped with a display screen that displays a picture corresponding to the theme of the audio being played.

Within each theme, the user can customize the mood of the material being broadcast. For example, the software application on the mobile telephone allows the user to select one of a variety of internet radio stations for playback on an individual speaker, within the theme of the speaker. For example with the Christmas speaker, several different radio stations could be offered: Pop music, classical, easy listening, childrens, etc., all playing Christmas music.

DETAILED DESCRIPTION

As used in this specification and the appended claims, the singular forms "a", "an" and "the" include plural referents unless the context clearly indicates otherwise. Thus, for example, reference to "a radio" includes a combination of two or more radios, and the like.

As used in this specification and the appended claims, "internet" refers not only to the internet, but also to any wide area network or local area network. Use of the term "internet" is not intended to limit the present invention to communications received via the world wide web.

As used in this specification and the appended claims, "pre-selected" means that the internet radio address, or URL, has been programmed into the radio. The pre-selected address may be a default address, or a selection of addresses to which the user can set the radio to default.

As used in this specification and the appended claims, a "speaker" means any sound emitting device and is not limited to standard electromechanical transducer type speakers. Non-limiting examples of suitable speakers are piezoelectric speakers, electrostatic speakers, flat panel speakers and digital speakers.

As used in the specification and the appended claims, a "smartphone" is a mobile telephone equipped with internet capability.

As used in the specification and the appended claims, an "application" or "app" is a software program installed on a smartphone, which can perform certain functions directly or is used to directly connect the smartphone to an internet-based program via a link on the display screen of the smartphone.

Figure 1:
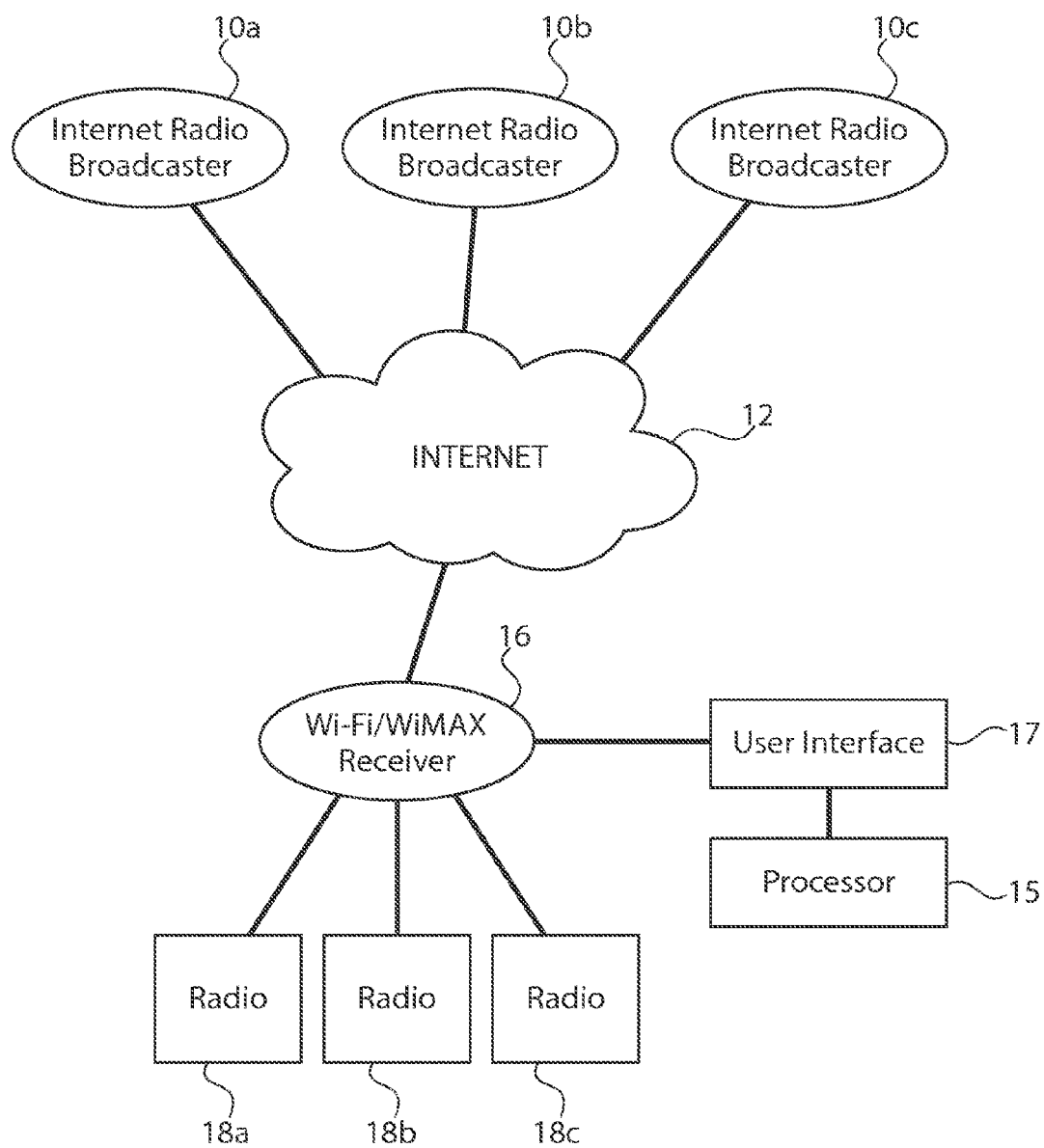
FIG. 1 illustrates a block diagram of an Internet Radio broadcast receiving station.

Referring to FIG. 1, one or more Internet Radio Broadcasters 10a, 10b and 10c, provide electronic signals through the internet 12. The signals can be received by a combination Wi-Fi/Wi-Max receiver/radio 16 and played by multiple speakers 18a, 18b and 18c. The receiver 16 has a processor 15 and a user interface 17 for controlling the preselected stations, as well as volume from each of the speakers. The processor assigns each one of internet radio stations 10a, 10b, 10c to one of speakers 18a, 18b, 18c so that each speaker plays a different radio station. The receiver 16 is wirelessly connected to the internet or other information highway. In a preferred embodiment, the receiver/processor/interface are embodied in a smartphone 60, shown in FIG. 2.

The receiver 16 connects to the internet or other information highway and the processor 15 directs the receiver to a preselected address on the internet or other information highway. The outside of each of the speakers 18a, 18b, 18c has an ornamental design related to the topic of the signals received from the preselected address on the internet or other information highway. Each speaker 18a-18c plays a different channel and the ornamental design matches the theme of the signals being played.

Detailed embodiments of the invention have a processor 15 that connects to a plurality of preselected addresses on the internet or other information highway. The apparatus also has an interface 17 allowing the user to control various aspects of each of the speakers such as volume and channel selection within the theme of the speaker.

The ornamental design of some embodiments may be selected from the group consisting of: holiday themes, garden themes, spa themes, patriotic themes, sports, etc. The ornamental design of the speaker may be a representation of an edifice, a character, a piece of art or other similar representation. The apparatus defaults to an internet radio station which is correlated with the ornamental design when power is supplied to the speaker.

Figure 2:
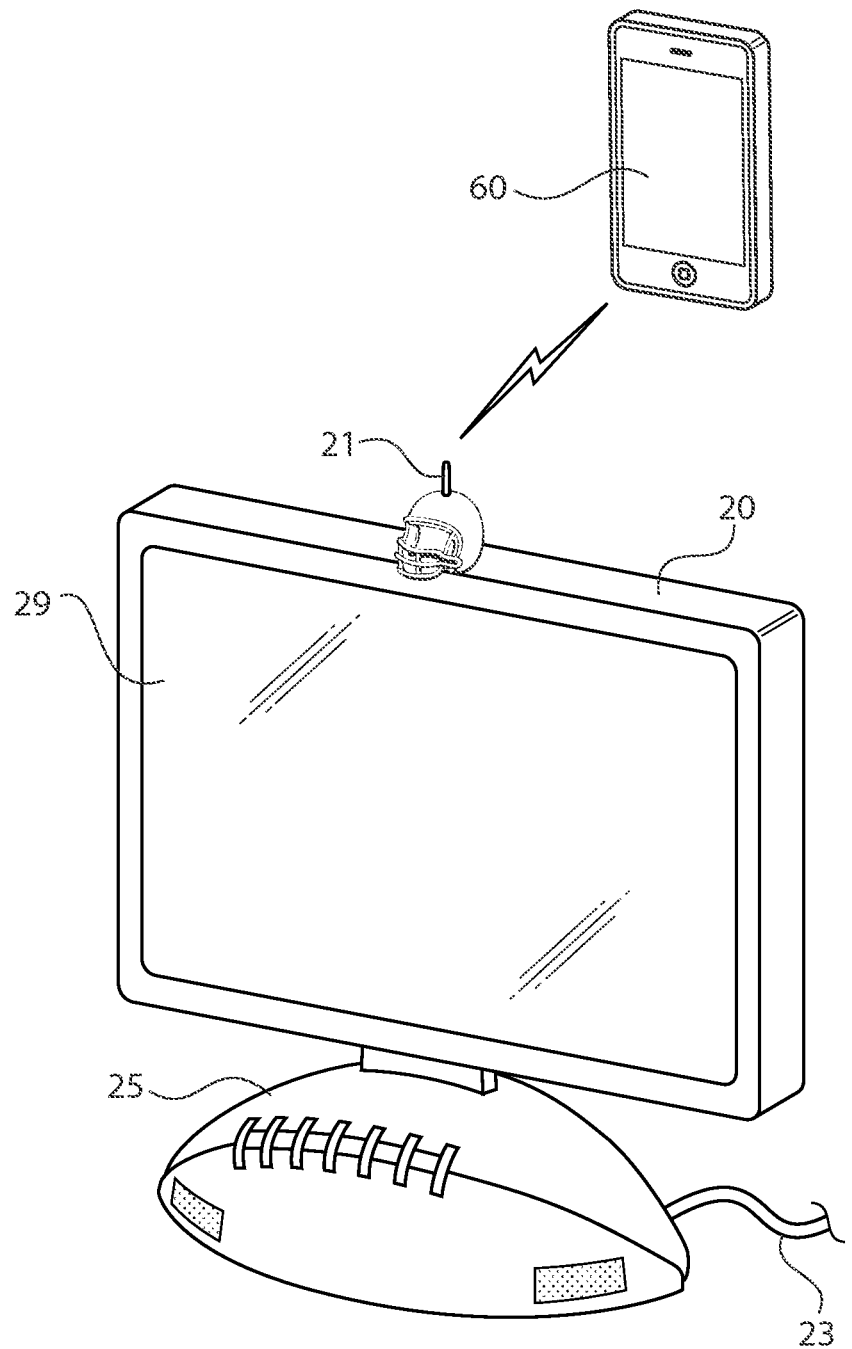
FIG. 2 shows an embodiment where a smartphone communicates wirelessly with a speaker for broadcasting the radio.

FIG. 2 shows a speaker 20 according to one or more embodiments of the invention. The speaker 20 shown has an ornamental design related to football. The user can supply power to the speaker by either connection of a power cord 23 to a standard power outlet or by battery power (not shown). Any buttons and dials on the speaker can be shaped in accordance with the ornamental design. For example, the user may power the speaker 20 by pressing a power button 25, shown as a football-shaped button.

The speaker 20 is programmed with a specific internet radio station controlled by the processor 15 in smartphone 60. This radio station will act as a default station related to the ornamental design. Here, the speaker 20 may tune to an internet radio station associated with the National Football League, or a station that broadcast college football games. The user may be able program smartphone 60 to add additional internet radio stations via an application that can be downloaded to smartphone 60.

Once powered, speaker 20 is designed to broadcast the default internet radio station. The mobile phone 60 communicates via WiFi or other method to speaker 20 or via a wired connection 23 using, for example, an Ethernet connection to a computer or an internet appliance, USB, IEEE-1394, serial, parallel, or any other suitable connection.

The speaker 20 can also have a screen 29 which can display information related to the theme of the internet radio station that is being broadcast. For example, the screen 29 can display a football themed graphic, a picture of a prominent player or any other graphic that is related to the content of the station being played. Screen 29 can be placed on a speaker 20 even without extra ornamentation, so that the display 24 is the only ornamentation to indicate the theme of the speaker. The ornamentation displayed by screen 24 is transmitted to speaker 20 from smartphone 60. The software application installed in smartphone 60 connects to a database with graphics that match the topic being transmitted, and transmits these graphics to the screen 24.

Figure 3:
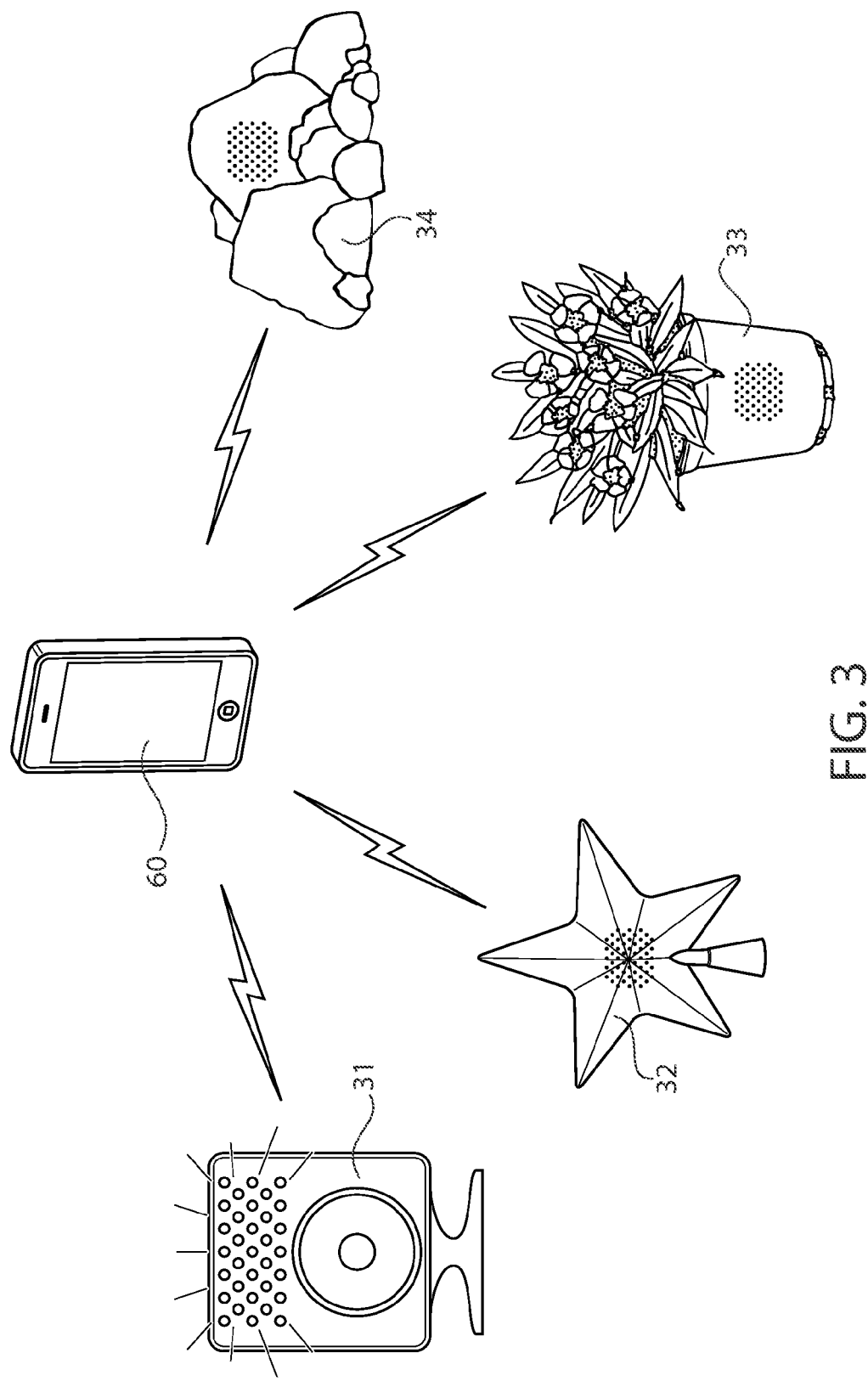
FIG. 3 shows the system according to the invention with several speakers having different ornamentation.

FIG. 3 shows the system according to the invention with several different themed speakers. Smartphone 60, which contains the receiver 15, processor 15 and user interface 17 to select the radio stations, is wirelessly connected via Wifi or other means to multiple speakers 31, 32, 33, 34, which are positioned at various locations around a user's home or business. Each one of speakers 31-34 has a different physical appearance, which coordinates with the theme of the internet radio station that is synched with the speaker. For example, speaker 32 is designed as a Christmas tree topper and is set to play Christmas music from Christmas radio stations. Speaker 33 is designed as a plant and is set to default to music or sounds that would be suitable for a garden. For example, speaker 33 could play bird sounds. Speaker 34 is designed as a fountain and is set to play music or sounds with a spa theme. Speaker 31 is a regular box-type speaker, but when powered on emits colored lights in a theme coordinated with the radio station being played. For example, speaker 31 could default to patriotic-themed radio stations and emit red, white and blue light. The speakers can be configured so that upon connecting the speakers wirelessly to the smartphone 60, the speakers automatically default to the respective preprogrammed radio stations. Processor 15 inside of mobile telephone 60 recognizes an identifying signal from each of the speakers 31-34 when the speakers are connected, which then directs processor 15 to the designated preselected radio stations that correspond to the ornamental appearance of each speaker.

Figure 4:
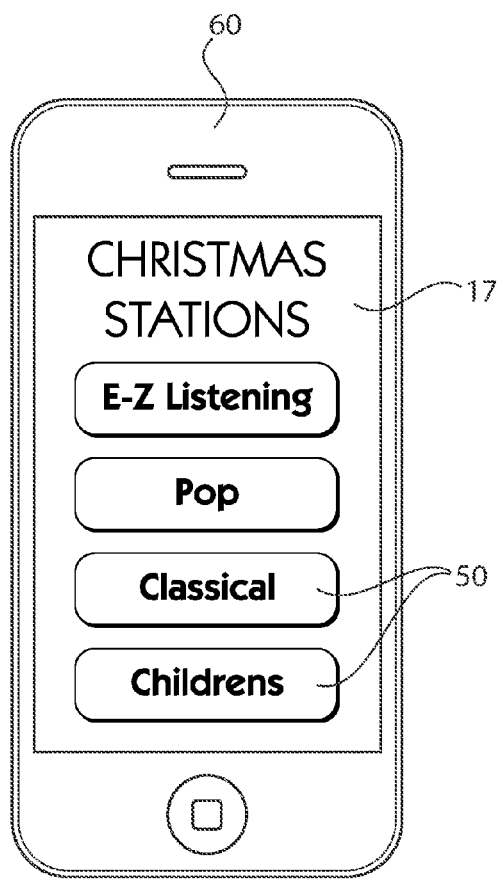
FIG. 4 shows the user interface of the mobile telephone displaying the connected speakers.

The present invention allows a user to customize a whole house audio system with ornamental speakers that play different thematic programming in each room. The software loaded on the mobile telephone allows the user to create a custom audio experience by selecting the ornamental speakers to be connected via a mobile telephone. A software application loaded onto mobile telephone creates the user interface 17 that allows the user view and control the speakers associated with the application, as shown in FIG. 4. The software recognizes each of the speakers and its corresponding theme, to direct the proper radio station to each speaker. As shown in FIG. 4, the user interface 17 displays via icons 40 all of the speakers that are connected wirelessly to the mobile phone. The user can touch the icon 40 of any of the speakers to further customize the playing experience.

Figure 5:
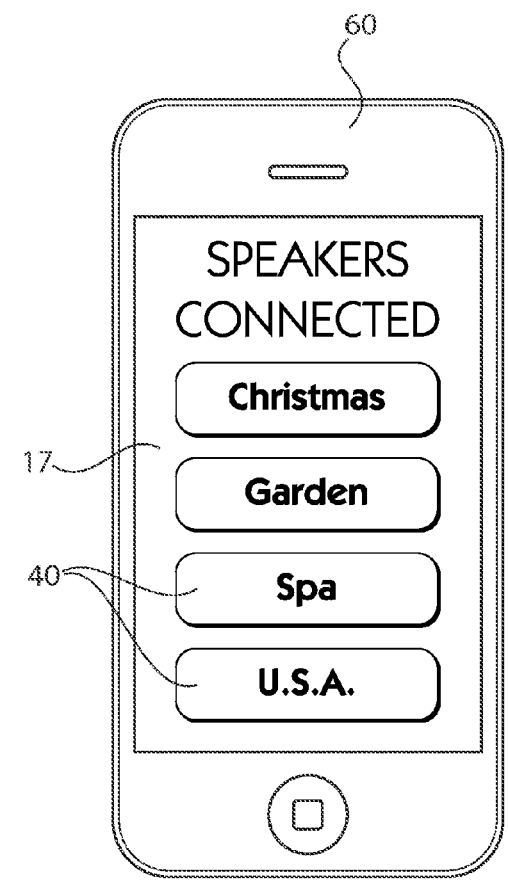
FIG. 5 shows the user interface displaying the various options for radio stations for a single speaker.

For example, as shown in FIG. 5, the software could offer a selection of different radio stations for each of the themes. For example, with the Christmas themed speaker 32, the software could be configured to allow the user to select one icon 40 of the Christmas speaker, which then leads to a display of several different Christmas station icons 50, based on the mood of the user. The user can then pick one of the icons 50 for play through speaker 32.

The various embodiments and aspects of the invention described here can be employed individually or in conjunction with other embodiments and aspects. Descriptions of individual aspects and embodiments does not preclude the inclusion of other aspects, embodiments or additional structural components.

It is to be understood that the invention is not limited to the details of construction or process steps set forth in the following description. The invention is capable of other embodiments and of being practiced or being carried out in various ways.

While there have been shown, described and pointed out fundamental novel features of the invention as applied to preferred embodiments or aspects thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A system for playing signals received from the internet or other information highway on several speakers simultaneously, comprising:
    an internet radio device comprising:
        a receiver that connects to the internet or other information highway; and
        a processor in the receiver that is programmed to connect to preselected addresses on the internet or other information highway;
        a user interface that is configured for allowing a user to control processes of the processor; and
    a plurality of speakers configured for connecting to the smartphone, the speakers being adapted to play signals received from the internet by the receiver, each of the speakers having an ornamental design that is related to a topic of the signals received from one of the preselected addresses on the internet or other information highway, wherein connecting the smartphone to the speakers causes the smartphone to default to the preselected internet addresses related to the topics of the ornamental designs, and wherein each speaker has a different ornamental design and each speaker is configured to default to a different internet address than the remaining speakers.

2. The system of claim 1, wherein the receiver wirelessly connects to the internet or other information highway.

3. The system of claim 1, wherein the receiver wirelessly connects to the internet or other information highway via a Wi-Fi connection.

4. The system of claim 1, wherein the ornamental design is a colored light display.

5. The system of claim 1, wherein the ornamental design comprises a display screen and a graphic displayed on the display screen that coordinates with the preselected address played by the speaker.

6. The system of claim 1, wherein the user interface is configured for allowing the user to select an internet radio station from among a group of preselected radio stations for each speaker.

7. The system of claim 1, wherein the internet radio device is a smartphone.

* * * * *